Patented Aug. 19, 1924.

1,505,202

UNITED STATES PATENT OFFICE.

EDWARD K. JUDD, OF PALISADE, NEW JERSEY, ASSIGNOR OF ONE-THIRD TO ALFRED M. THOMSEN, OF ALAMEDA, CALIFORNIA, AND ONE-THIRD TO EMERSON W. JUDD, OF NEW YORK, N. Y.

RECOVERY OF MAGNESIUM COMPOUNDS FROM BRINES.

No Drawing.   Application filed December 12, 1922. Serial No. 606,531.

*To all whom it may concern:*

Be it known that I, EDWARD K. JUDD, a citizen of the United States, residing at Palisade, in the county of Bergen, State of New Jersey, have invented certain new and useful Improvements in Recovery of Magnesium Compounds from Brines; and I do hereby declare the following to be a full, clear, and exact description of the invention, such as will enable others skilled in the art to which it appertains to make and use the same.

This invention relates to the treatment of sea water and other brines for the recovery of magnesium compounds therefrom.

Sea water contains salts of magnesium in about the following average percentages by weight, based on a total salinity of 3.5 per cent:

|  | Per cent by weight of sea water. | Equivalent per cent of MgO. |
|---|---|---|
| Magnesium chloride | 0.381 | 0.161 |
| Magnesium sulphate | 0.166 | 0.055 |
| Magnesium bromide | 0.008 | 0.002 |
| Total | 0.555 | 0.218 |

Magnesium can be precipitated as hydroxide from a solution of its salts by the addition of caustic lime or calcium hydroxide. In commercial application of this principle, it has been the usual practice to add the calcium hydroxide in the form of milk of lime, which is essentially a suspension of undissolved particles of slaked lime in a saturated water-solution of calcium hydroxide. When that procedure is followed for precipitating magnesium hydroxide from sea water and similar brines the chemical reaction occurring on the surface of the lime particles coats these with an adherent envelope of gelatinous magnesium hydroxide which retards or prevents further reaction. The resulting precipitate will contain a considerable proportion of lime and will thereby be rendered unfit for many of the purposes for which magnesia is used.

Furthermore, in the case of fairly concentrated solutions of magnesium salts which contain sulphates, the calcium sulphate resulting from the addition of lime will be largely insoluble in the solution and will be precipitated as an injurious impurity in the magnesium hydroxide. Such contamination either requires further operations for its removal or necessitates preliminary treatment for the elimination of soluble sulphates from the solution.

It is the principal object of the present invention to provide a process whereby magnesia and derivatives thereof can be obtained from sea water and other brines practically pure and substantially free from calcium and sulphates. Other and further objects will appear as the description proceeds.

I have found that if magnesium hydroxide is precipitated from sea water by the addition of a clarified solution of calcium hydroxide in water neither of the above mentioned difficulties will be experienced; the precipitated magnesium hydroxide will contain no particles of unreacted lime and the calcium sulphate resulting from the reaction with soluble sulphates will remain completely soluble in the large bulk of solution present.

I have further found that magnesium hydroxide can be similarly precipitated substantially free from calcium and sulphates from sulphate-bearing solutions more concentrated than sea water, by maintaining the volume of solution present when the reaction occurs sufficient to hold in solution all of the calcium sulphate formed.

In the preferred practice of my invention, I treat sea water or other brine, clarified by filtration or otherwise and after a preliminary treatment to remove carbon dioxide if desirable, with a sufficient quantity of clarified solution of calcium hydroxide to convert all, or any desirable proportion of the magnesium salts present into magnesium hydroxide, maintaining a sufficient volume of solution to keep in solution any calcium sulphate formed.

The calcium hydroxide is best prepared by first slaking quicklime with a limited amount of water and adding the resulting milk of lime to a larger volume of water. The lime solution is then clarified by settling or filtering, or both. The clarification can be made continuous by slowly overflowing the solution from vats wherein the excess of undissolved lime is settled out. The calcium hydroxide solution should be as nearly saturated as practicable, for economic reasons. New fresh water may be used, if easily available, but it will usually be cheaper, and at the same time more effective, to use sea water from which the magnesium salts have been previously removed by the described reaction. To this end, part of the magnesia-free solution, after separation of the magnesium hydroxide in the manner to be described, is again saturated with caustic lime and returned to contact with new sea water.

The sea water will also usually require filtration or other means of clarification to remove organic and other suspended impurities. This can be readily accomplished by percolation through a sand filter. Furthermore, if the sea water contains carbon dioxide, this will combine with the calcium hydroxide to form insoluble calcium carbonate which will then appear in the precipitated magnesium hydroxide. If the amount of calcium carbonate thus introduced into the product is objectionable, the carbon dioxide in the sea water can be removed by the preliminary addition of a limited amount of calcium hydroxide solution, sufficient to neutralize the carbon dioxide, the calcium carbonate thus formed being removed at the same time as the other impurities.

The proportions necessary for complete conversion will depend upon the magnesium contents of the sea water or other brine as well as upon the degree of saturation of the lime solution, and can be ascertained by a simple qualitative test. In general, it requires about three volumes of saturated lime solution to precipitate all of the magnesia obtainable from one volume of normal sea water. There is no technical necessity for maintaining an exact molecular equivalence between the magnesium salts present and the lime to be added, but this adjustment avoids either waste of lime or fruitless pumping of sea water. Where the precipitating solution is made up from a part of the magnesium-free salt water resulting from the reaction, it is usually satisfactory to prepare the calcium hyroxide solution by adding milk of lime to about three fourths of the residual liquor.

The precipitated magnesium hydroxide is then preferably collected by settling and recovered by decantation or filtering. It must then be washed substantially free from soluble salts by the application of fresh water, which may be done at the filter, in decantation tanks, or in other convenient manner. The separation of the magnesium hydroxide can be made continuous by utilizing a method of continuous overflow for discharging the magnesium-free water. I have found that the freshly precipitated magnesium hydroxide has a settling rate of about 3.5 cm. per min. By running the suspension into a vat and controlling the overflow a substantially complete separation of the precipitate and the liquor can be effected.

The mixture of sea water or other brine with the clarified lime solution can be readily accomplished by pumping the two streams in regulated proportion into the upper end of a trough leading to one or more vats. The separation of the precipitate may then be accomplished in these vats in the manner just described or in any other suitable way, such as filtration or intermittent settling.

The washed magnesium hydroxide may then be dried and finally calcined at a temperature (red heat) sufficient to expel the combined water of hydration, giving a product which will be practically pure magnesium oxide.

In order to facilitate the filtering and washing of the product, the magnesium hydroxide may be converted into magnesium carbonate by injecting carbon-dioxide gas from any suitable source, such as a coke fire or a lime kiln, into the suspension of the hydroxide and controlling the reaction so that no free calcium hydroxide is present. The resulting magnesium carbonate can then be filtered, washed and dried, and marketed as such, or it may be calcined in the manner described except that a higher temperature and more prolonged heating will be required to yield magnesium oxide than when the hydroxide is calcined.

If it is desired to make magnesium salts, the final steps of drying and calcining may be omitted. The freshly precipitated and washed magnesium hydroxide may be subjected immediately to the action of appropriate acids or other reagents to convert it into the desired salts.

It will thus be seen that the present invention provides a method of separating magnesium hydroxide substantially free from calcium or sulphates from sea water or other brines by the use of clarified solutions of calcium hydroxide as a precipitant. It will also be seen that this invention provides a process wherein the precipitating solution can be made up by regeneration of the residual liquor whereby a substantial reduction in the required amount of fresh water is attained. It will further be seen that this invention provides a method for the economical production of magnesia or any desired derivative thereof in a very high state of purity.

I claim:

1. The process of recovering magnesium hydroxide from brines by adding thereto a clarified solution of calcium hydroxide.

2. The process of recovering magnesium hydroxide from brines by adding thereto a clarified solution of calcium hydroxide, separating the precipitated magnesium hydroxide and washing the precipitate substantially free from soluble salts.

3. The process of recovering magnesium hydroxide from sea water by precipitation with a solution of calcium hydroxide free from suspended lime.

4. In the process of recovering magnesium hydroxide from brines containing carbon dioxide, the preliminary step of adding a limited amount of a clarified solution of calcium hydroxide to precipitate the carbon dioxide and separating this precipitate, whereby to avoid contamination with calcium carbonate.

5. The process of recovering magnesium hydroxide from brines containing sulphates by adding thereto a clarified solution of calcium hydroxide and maintaining the volume of solution sufficient to keep in solution all calcium sulphate formed.

6. The process of recovering magnesium hydroxide from brines by adding a clarified solution of calcium hydroxide, separating the precipitated magnesium hydroxide and preparing further quantities of clarified calcium hydroxide solution for subsequent treatments from the separated liquor.

7. The process of recovering magnesium hydroxide from sea water comprising adding about three volumes of a clarified and saturated solution of calcium hydroxide to about one volume of sea water and separating the precipitated magnesium hydroxide.

8. The process of recovering magnesium carbonate from brines by adding a clarified solution of calcium hydroxide, separating the precipitated magnesium hydroxide, and converting the precipitated magnesium hydroxide into magnesium carbonate by injecting carbon dioxide into a suspension of the same.

In testimony whereof I affix my signature.

EDWARD K. JUDD.